(12) United States Patent
Qiu et al.

(10) Patent No.: US 11,478,019 B2
(45) Date of Patent: Oct. 25, 2022

(54) VOLTAGE OUTPUT CIRCUIT, ELECTRONIC DEVICE AND ELECTRONIC CIGARETTE

(71) Applicant: Changzhou Patent Electronic Technology Co., LTD., Changzhou (CN)

(72) Inventors: Weihua Qiu, Changzhou (CN); Jianjun Liu, Changzhou (CN); Guangze Liu, Changzhou (CN); Zhiming Song, Changzhou (CN)

(73) Assignee: CHANGZHOU PATENT ELECTRONIC TECHNOLOGY CO., LTD., Changzhou (CN)

( * ) Notice: Subject to any disclaimer, the term of this patent is extended or adjusted under 35 U.S.C. 154(b) by 273 days.

(21) Appl. No.: 16/776,498

(22) Filed: Jan. 29, 2020

(65) Prior Publication Data

US 2020/0237007 A1    Jul. 30, 2020

(30) Foreign Application Priority Data

Jan. 29, 2019   (CN) .......................... 201910087877.1

(51) Int. Cl.

| | | |
|---|---|---|
| *H01M 10/48* | (2006.01) |
| *A24F 40/53* | (2020.01) |
| *A24F 40/90* | (2020.01) |
| *A24F 40/42* | (2020.01) |
| *A24F 40/60* | (2020.01) |
| *H01M 10/04* | (2006.01) |
| *H01M 10/42* | (2006.01) |

(52) U.S. Cl.
CPC .............. *A24F 40/53* (2020.01); *A24F 40/42* (2020.01); *A24F 40/60* (2020.01); *A24F 40/90* (2020.01); *H01M 10/0436* (2013.01); *H01M 10/4257* (2013.01); *H01M 10/48* (2013.01); *H01M 2010/4271* (2013.01)

(58) Field of Classification Search
CPC .......... A24F 40/10; A24F 40/42; A24F 40/53; A24F 40/60; A24F 40/90; H01M 10/0436; H01M 10/4257; H01M 10/48; H01M 2010/4271; H02J 7/00; Y02E 60/10; Y02P 70/50
See application file for complete search history.

(56) References Cited

U.S. PATENT DOCUMENTS

| | | |
|---|---|---|
| 2016/0360789 A1 | 12/2016 | Hawes et al. |
| 2017/0071257 A1 | 3/2017 | Lin |
| 2017/0196270 A1 | 7/2017 | Vick et al. |
| 2017/0197044 A1 | 7/2017 | Buchberger |
| 2017/0222468 A1 | 8/2017 | Schennum et al. |

*Primary Examiner* — Victoria H Lynch
(74) *Attorney, Agent, or Firm* — Cheng-Ju Chiang

(57) ABSTRACT

A voltage output circuit, an electronic device and an electronic cigarette are provided. The voltage output circuit includes a battery assembly and a control circuit. The battery assembly is electrically connected with an atomizing circuit. A first signal output end of the control circuit is connected with a main control circuit, and a second signal output end of the control circuit is connected with the main control circuit. When the main control circuit receives a sensing signal output by the first signal output end and a load working signal output by the second signal output end, the main control circuit controls the battery assembly to supply power to the atomizing circuit, such that the atomizing circuit starts to work, thereby solving the problem that the mechanical key is easy to be triggered by non-human in the related art to cause potential safety hazards.

18 Claims, 8 Drawing Sheets

VOLTAGE OUTPUT CIRCUIT, ELECTRONIC DEVICE AND ELECTRONIC CIGARETTE

TECHNICAL FIELD

The present invention relates to the technical field of simulated smoking, and in particular, to a voltage output circuit, an electronic device and an electronic cigarette.

BACKGROUND

At present, electronic cigarette, as a substitute of tobacco product, is more and more popular in the market because of its portability and large amount of smoke.

The electronic cigarette usually provides a mechanical key configured for being pressed several times to turn on/off the machine. After the electronic cigarette is turned on, pressing the mechanical key can trigger the electronic cigarette to atomize and generate smoke. However, after the user uses the electronic cigarette, if he forgets to turn off the electronic cigarette, it is easy to cause the electronic cigarette to atomize due to other objects mistakenly triggering the mechanical key, to cause potential safety hazards.

SUMMARY

In order to solve the potential safety hazard problem in the prior art that it is easy to cause the electronic cigarette to atomize due to mistakenly triggering the mechanical key by non-human, the embodiment of the present invention provides a voltage output circuit, an electronic device and an electronic cigarette. The technical solution is as follows:

In a first aspect, a voltage output circuit is provided. The voltage output circuit includes a battery assembly and a control circuit, wherein:

the battery assembly is electrically connected with an atomizing circuit;

a first signal output end of the control circuit is connected with a main control circuit, and a second signal output end of the control circuit is connected with the main control circuit;

when the main control circuit receives a sensing signal output by the first signal output end and a load working signal output by the second signal output end, the main control circuit controls the battery assembly to supply power to the atomizing circuit, such that the atomizing circuit starts to work.

Optionally, the voltage output circuit further includes a power control circuit, wherein:

a positive pole of the battery assembly is connected with a negative pole of the battery assembly through the power control circuit;

the battery assembly is connected with the atomizing circuit through the power control circuit;

when the power control circuit detects that the battery assembly is abnormal, the power control circuit disconnects the battery assembly from the voltage output circuit.

Optionally, the control circuit includes touch chip, the touch chip includes a touch input terminal, a touch signal output terminal and a synchronization/holding mode configuration terminal, the touch signal output terminal is the first signal output end, wherein:

the synchronization/holding mode configuration terminal is electrically connected with system power source;

the touch input terminal is connected with a touch pad.

Optionally, the touch signal output terminal is connected with the main control circuit through a signal anti-interference coupling resistance;

the touch input terminal is grounded by an adjusting capacitance having a first sensitivity;

the synchronization/holding mode configuration terminal is connected to the system power source through a first pull-up resistor.

Optionally, the touch chip further includes an output effective level configuration terminal and a power source terminal, wherein:

the output effective level configuration terminal is grounded through an adjusting capacitor having a second sensitivity; and/or the output effective level configuration terminal is grounded through a filter capacitor.

Optionally, the control circuit includes a mechanical key, wherein:

a first end of the mechanical key is electrically connected with the system power source, the first end is the second signal output end, and a second end of the mechanical key is grounded.

Optionally, the first end of the mechanical key is connected with the system power source through a second pull-up resistance; and/or the first end of the mechanical key is grounded through an anti-interference resistance.

Optionally, the battery assembly is further connected with a charging circuit through the power control circuit, the electric energy provided by an external power source can be charged to the battery assembly through the charging circuit and the power control circuit;

the charging circuit is further connected with the main control circuit through the power control circuit, when the electric energy provided by the external power source is transmitted to the battery assembly through the charging circuit and the power control circuit, the electric energy provided by the external power source is further provided to the main control circuit through the charging circuit and the power control circuit.

In a second aspect, an electronic device is provided. The electronic device includes the above voltage output circuit.

In a third aspect, an electronic cigarette is provided. The electronic cigarette includes a main control circuit, an atomizing circuit and a voltage output circuit, wherein the load in the atomizing circuit is an atomizer, the voltage output circuit includes a battery assembly and a control circuit, wherein:

the battery assembly is electrically connected with the atomizing circuit;

a first signal output end of the control circuit is connected with the main control circuit, and a second signal output end of the control circuit is connected with the main control circuit;

when the main control circuit receives a sensing signal output by the first signal output end and a load working signal output by the second signal output end, the main control circuit controls the battery assembly to supply power to the atomizing circuit, such that the atomizing circuit starts to work.

The beneficial effects brought by the technical solutions of the embodiment of the present invention are:

The voltage output circuit provided by the embodiment of the present invention includes a battery assembly and a control circuit, wherein the battery assembly is electrically connected with the atomizing circuit; the first signal output end of the control circuit is connected with the main control circuit, and the second signal output end of the control circuit is connected with the main control circuit; when the main control circuit receives the sensing signal output by the first signal output end and the load working signal output by the second signal output end, the main control circuit controls the battery assembly to supply power to the atomizing circuit, so that the atomizing circuit starts to work, thereby solving the problem that the mechanical key is easy to be triggered by non-human in the related art to cause potential safety hazards, and achieving the effect of improving the safety of the electronic device using the voltage output circuit.

In a fourth aspect, a battery device for an electronic cigarette is provided. An atomizing circuit is provided in the electronic cigarette. The battery device includes a touch key, a mechanical key, a battery assembly and a control board, wherein the atomizing circuit, the touch key, the mechanical key and the battery assembly are all electrically connected with the control board, the touch key is configured to generate a sensing signal and feed the sensing signal to the control board, the mechanical key is configured to generate a load working signal and feed the load working signal to the control board, when the control board receives both the sensing signal and the load working signal, the control board controls the conduction between the atomizing circuit and the battery assembly.

Optionally, the control board receives both the sensing signal and the load working signal, it means that:
  the control board receives the sensing signal and the load working signal at the same time; or
  the control board receives the sensing signal and then receives the load working signal before the sensing signal is disappeared; or
  the control board receives the load working signal and then receives the sensing signal before the load working signal is disappeared; or
  after the control board receives the sensing signal, it starts timing, and the control board receives the load working signal within a preset time; or
  after the control board receives the load working signal, it starts timing, and the control board receives the sensing signal within a preset time.

Optionally, when detecting a biological information, the touch key generates the sensing signal; or when detecting the change of capacitance or resistance of the touch key, the touch key generates the sensing signal; when the mechanical key is in a closed state, the mechanical key generates the load working signal.

Optionally, the biological information is fingerprint, biological current, or body temperature.

Optionally, the touch key is movably arranged on the battery device, the mechanical key is arranged on the moving path of the touch key, the battery device further includes a resisting member, the resisting member is also arranged on the moving path of the touch key, when the touch key is activated, the touch key drives the mechanical key to move, so that the mechanical key abuts against the resisting member to cause the mechanical key to be closed, or when the touch key is activated, the touch key drives the resisting member to move, so that the resisting member abuts against the mechanical key to cause the mechanical key to be closed.

Optionally, the battery device includes a bracket and a deformable member, the battery assembly is installed in an inner cavity of the bracket, the deformable member is provided on the bracket, the touch key and the mechanical key are arranged on opposite sides of the deformable member, the touch key is located in the inner cavity of the bracket and the mechanical key is located outside the bracket, pressing the touch key can cause the deformable member to deform and move towards the inner cavity of the bracket, and the mechanical key is driven by the deformable member to move towards the inner cavity of the bracket.

Optionally, the inner wall of the bracket is provided with a limiting plate and a blocking portion, the limiting plate acts as the resisting member, the blocking portion is located between the limiting plate and the deformable member, when the deformable member moves to resist on the blocking portion, the mechanical key abuts against the limiting plate to cause the mechanical key to be closed.

Optionally, a penetrating groove is provided in a side wall of the bracket, the deformable member is disposed in the penetrating groove, the deformable member includes a pressing portion and a connecting portion, one end of the connecting portion is connected with the groove wall of the penetrating groove, the other end of the connecting portion is connected with the pressing portion, and the width of the connecting portion is smaller than the width of the pressing portion.

Optionally, the battery device further includes a key mounting member used for enveloping the pressing portion of the deformable member, the key mounting member is provided with a wiring, the touch key and the mechanical key are mounted on opposite sides of the key mounting member, the touch key and the mechanical key are electrically connected with the control board by the wiring.

Optionally, the battery device further includes a battery shell, the bracket and the control board are received in the battery shell, a side wall of the battery shell is provided with a passing groove, the touch key is located in the passing groove or partially extends to the outside of the battery shell from the passing groove.

Optionally, the battery device further includes a second electrode and an electrode plate, the second electrode and the electrode plate are installed to one end surface of the bracket, the electrode plate is disposed around the second electrode, one of the positive and negative electrodes of the battery assembly is electrically connected with the second electrode, and the other one of the positive and negative electrodes of the battery assembly is electrically connected with the electrode plate.

Optionally, the battery device further includes a sealing gasket and a magnetic member, the bracket is provided with a mounting groove and a receiving groove in one end surface to which the second electrode and the electrode plate are installed, the mounting groove surrounds the receiving groove, the sealing gasket is installed in the mounting groove, the magnetic member is installed in the receiving groove, the electrode plate covers the sealing gasket and the magnetic member.

In a fifth aspect, an electronic cigarette is provided. The electronic cigarette includes the above battery device.

Optionally, the electronic cigarette further includes a cartridge, the cartridge includes a liquid storage assembly having a liquid storage chamber and an atomizer having an atomizing chamber, the atomizer is electrically connected with the atomizing circuit, when the circuit between the atomizing circuit and the battery assembly is turned on, the atomizer atomizes the cigarette liquid supplied from the liquid storage chamber to form smoke.

In the battery device or the electronic cigarette provided by the embodiment of the present invention, only when the control board receives both the sensing signal and the load working signal, can the circuit between the battery assembly and the atomizing circuit be turned on, thereby effectively preventing the non-human and the insulator from mistakenly triggering the touch key. Therefore, it is safe and convenient to use.

BRIEF DESCRIPTION OF THE DRAWINGS

In order to more clearly illustrate the technical solutions in the embodiments of the present invention, the drawings used in the description of the embodiments will be briefly described below. It is obvious that the drawings in the following description are only some embodiments of the present invention. For those of ordinary skill in the art, other drawings may also be obtained in light of these drawings without any creative efforts.

DETAILED DESCRIPTION OF PREFERRED EMBODIMENTS

In order to make the objects, the technical solution and the advantages of the present invention much clear, the embodiments of the present invention will be further described in detail below with reference to the accompanying drawings.

The present invention will now be described in detail in conjunction with the accompanying drawings. The accompanying drawings are simplified schematic views which shows fundamental structures of an exemplary embodiment of the present invention. Thus, merely the constructions related to the present invention are shown.

Figure 1:
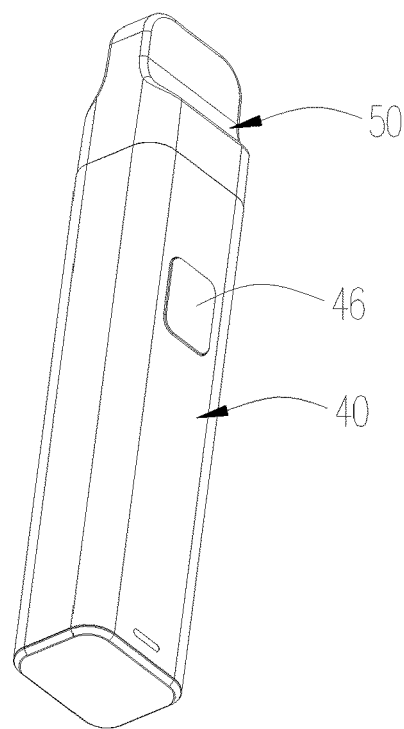
FIG. 1 is an isometric view of an electronic cigarette of the present invention.
Figure 2:
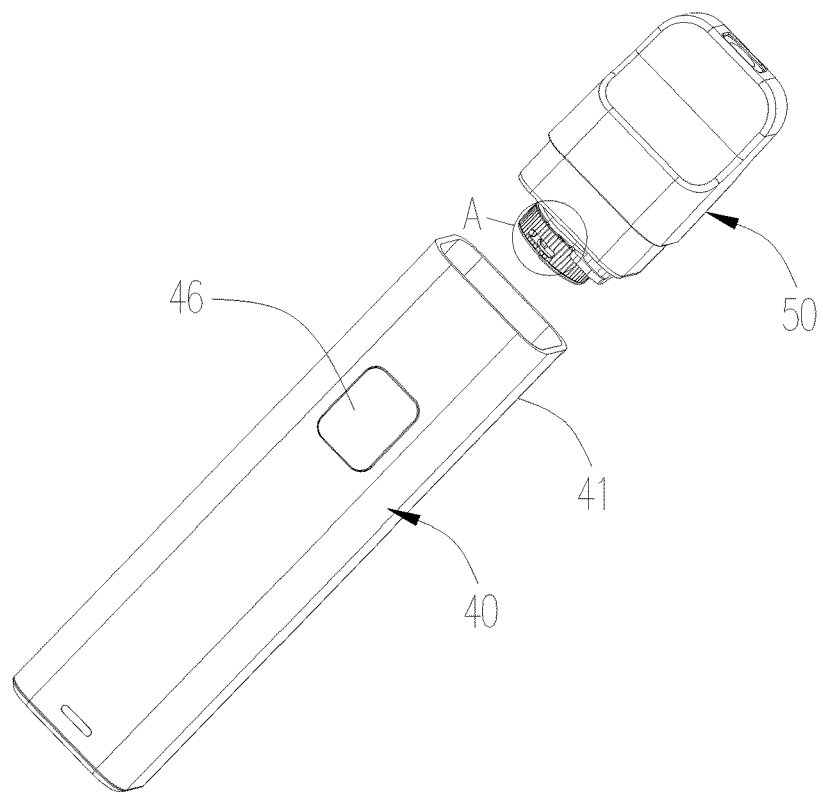
FIG. 2 is a partially exploded view of the electronic cigarette shown in FIG. 1.
Figure 3:
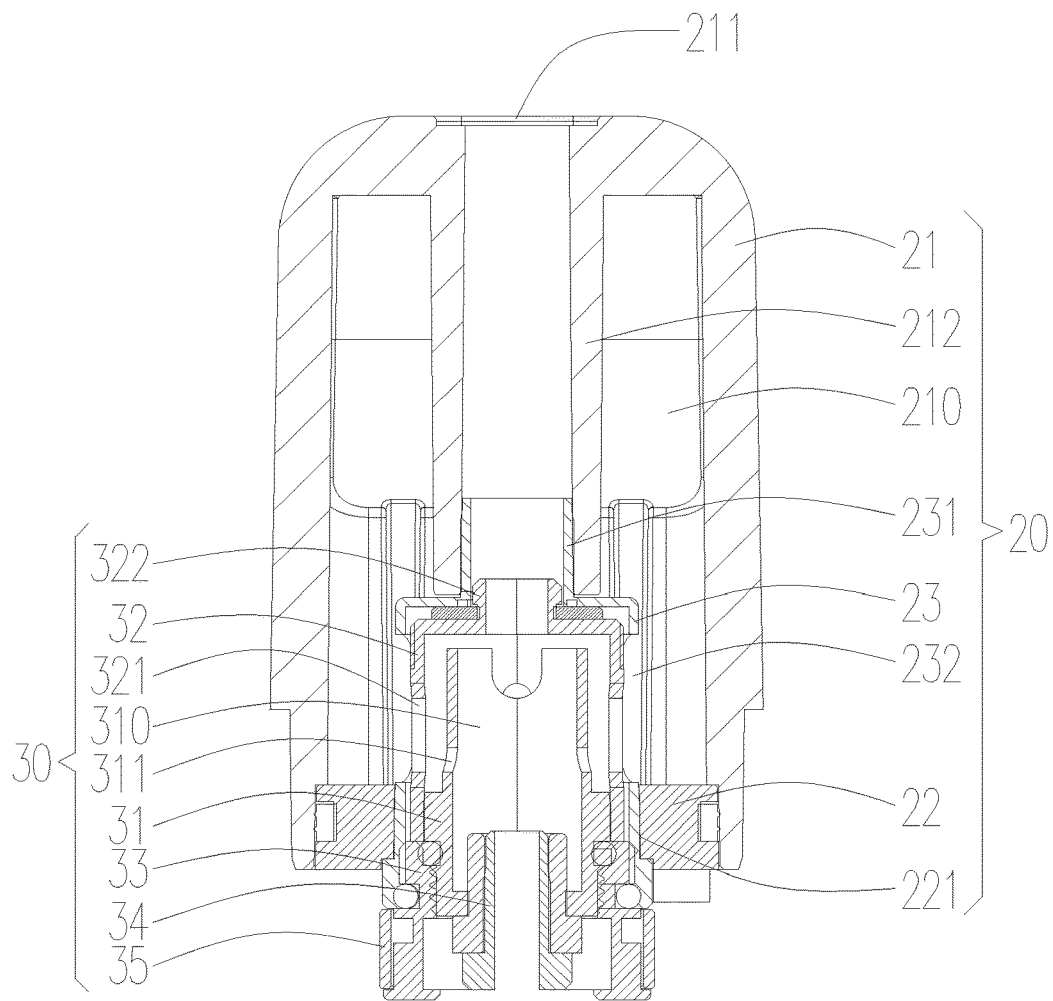
FIG. 3 is a cross-sectional view of the cartridge in the electronic cigarette shown in FIG. 2.

Referring to FIG. 1, FIG. 2 and FIG. 3, the present invention provides an electronic cigarette, which includes a cartridge 50 and a battery device 40 electrically connected with the cartridge 50. The cartridge 50 includes a liquid storage assembly 20 and an atomizer 30 connected with the liquid storage assembly 20. In use, the liquid storage assembly 20 supplies cigarette liquid to the atomizer 30, and the battery device 40 electrically drives the atomizer 30 to work, so that under the heating of the atomizer 30, the cigarette liquid generates smoke and the smoke is inhaled by the user.

Referring to FIG. 3, the liquid storage assembly 20 includes a cartridge case 21, a bottom base 22 disposed at one end of the cartridge case 21, and a connecting sleeve 23 connected to the bottom base 22.

In the embodiment, the cartridge case 21 is generally a hollow cylinder structure with an opening at the lower end, and a liquid storage chamber 210 for storing cigarette liquid is provided in the cartridge case 21. In one embodiment, the inner cavity of the cartridge case 21 forms the liquid storage chamber 210. In order to enable the user to observe the amount of cigarette liquid in the liquid storage chamber 210 through the cartridge case 21, so as to inject liquid or replace the cartridge 50 in time, the cartridge case 21 is made of transparent or translucent material. The cartridge case 21 is made of glass, or the cartridge case 21 is made of transparent or translucent plastic, such as polycarbonate (PC), polyetherimide (PEI), or polyethersulfone resin (PES).

The upper end surface of the cartridge case 21 is provided with a smoke outlet hole 211. The top of the cartridge case 21 extends downward along the axial direction of the cartridge case 21 to form a vent pipe 212 which is received in the liquid storage chamber 210. The two ends of the vent pipe 212 are through, and the inner cavity of the vent pipe 212 is connected with the smoke outlet hole 211. In addition, the upper end of the cartridge case 21 is a flat structure to facilitate the user to suck through the smoke outlet hole 211.

The bottom base 22 is substantially in the form of a plate structure. The bottom base 22 is fitted in the lower end of the cartridge case 21. An inserting hole 221 is defined through the bottom base 22 along the axial direction of the bottom base 22, and the inserting hole 221 extends through the upper and lower surfaces of the bottom base 22. In this embodiment, the bottom base 22 and the cartridge case 21 are connected by plug-in. It can be understood that in other embodiments not shown, the bottom base 22 and the cartridge case 21 can also be connected by detachable means such as clamping connection, threaded connection or magnetic connection, etc., and it is not limited herein. A sealing member (not labelled) is provided between the cartridge case 21 and the bottom base 22 to prevent the cigarette liquid in the liquid storage chamber 210 from leaking from the gap between the cartridge case 21 and the bottom base 22.

The connecting sleeve 23 is generally a hollow cylinder structure with openings at two ends. The upper end of the connecting sleeve 23 is connected with the vent pipe 212, and the lower end of the connecting sleeve 23 is connected with the bottom base 22. Specifically, the upper end of the connecting sleeve 23 is provided with a connecting tube 231 having openings at both ends, the inner cavity of the connecting tube 231 is communicated with the inner cavity of the connecting sleeve 23, the connecting tube 231 is received in the vent pipe 212, the lower end of the connecting sleeve 23 is fitted in the inserting hole 221 of the bottom base 22, and the liquid storage chamber 210 is formed by the space surrounded by the cartridge case 21, the vent pipe 212, the connecting sleeve 23 and the bottom base 22. The side wall of the connecting sleeve 23 is provided with a liquid passing hole 232, which is communicated with the liquid storage chamber 210 and the inner cavity of the connecting sleeve 23.

Referring to FIG. 3 again, the atomizer 30 includes an atomizing tube 31, a sleeve pipe 32 sleeved outside the atomizing tube 31, a heating assembly (not shown) installed on the atomizing tube 31, a connecting seat 33 and a first electrode 34 installed on the atomizing tube 31, and an adjusting member 35 rotatably sleeved outside the connecting seat 33.

The atomizing tube 31 is generally a hollow cylinder structure with an opening at the upper end. The inner cavity of the atomizing tube 31 forms an atomizing chamber 310. The side wall of the atomizing tube 31 is provided with a U-shaped groove 311 along the axial direction of the atomizing tube 31. The U-shaped groove 311 passes through the inner and outer walls of the atomizing tube 31 and the upper end surface of the atomizing tube 31. The U-shaped groove 311 is communicated with the atomizing chamber 310. The sleeve pipe 32 is generally a hollow cylinder structure with an opening at the lower end. The sleeve pipe 32 and the atomizing tube 31 are mounted by interference fit. The top of the sleeve pipe 32 is provided with a through hole (not labelled) communicated with the atomizing chamber 310. The side wall of the sleeve pipe 32 is provided with a liquid inlet hole 321 corresponding to the U-shaped groove 311. In the embodiment, the U-shaped groove 311 has two pairs, each pair of the U-shaped grooves 311 are oppositely arranged on the side wall of the atomizing tube 31, and the connecting line of one pair of the U-shaped grooves 311 is perpendicular to the connecting line of the other pair of the U-shaped grooves 311. Correspondingly, the liquid inlet hole 321 also has two pairs, and a liquid inlet hole 321 corresponds to a U-shaped groove 311. The depth of one pair of the U-shaped grooves 311 along the axial direction of the atomizing tube 31 is greater than the depth of the other pair of the U-shaped grooves 311 along the axial direction of the atomizing tube 31.

The heating assembly includes a heating member (not shown) and a liquid absorbing member (not shown) in contact with each other. The liquid absorbing member has the ability to absorb the cigarette liquid. The heating member can heat the cigarette liquid, so that the cigarette liquid generates smoke under the heating of the heating member. In the embodiment, the heating assembly has two, one heating assembly is arranged on one pair of the U-shaped grooves 311. Since the depth of one pair of the U-shaped grooves 311 along the axial direction of the atomizing tube 31 is greater than the depth of the other pair of the U-shaped grooves 311 along the axial direction of the atomizing tube 31, when installed in place, one heating assembly is located below the other heating assembly. Taking the installation of one of the heating assemblies as an example, the liquid absorbing member is arranged on two oppositely disposed U-shaped grooves 311, one end of the liquid absorbing member is extended into one of the liquid inlet holes 321, the other end of the liquid absorbing member is extended into the other one of the liquid inlet holes 321, and the heating member is received in the atomizing chamber 310. In the embodiment, the heating member is arranged outside the liquid absorbing member, specifically, the heating member is wound around the liquid absorbing member, the heating member is spiral heating wire, and the liquid absorbing member is cotton. It can be understood that in other embodiments not shown, the heating member can also be arranged inside the liquid absorbing member, the heating member can also be heating tube, heating rod or heating sheet, and the liquid absorbing member can also be fiber rope, porous ceramics, porous graphite, etc., which is not limited herein.

The connecting seat 33 is generally a hollow cylinder structure with openings at two ends. The upper end of the connecting seat 33 is sleeved outside the atomizing tube 31. The first electrode 34 is generally a hollow cylinder structure with openings at two ends. The first electrode 34 is inserted into the bottom of the atomizing tube 31, and the inner cavity of the first electrode 34 is communicated with the atomizing chamber 310 and the inner cavity of the connecting seat 33. One end of the heating member is electrically connected with the first electrode 34, and the other end of the heating member is electrically connected with the connecting seat 33 through the atomizing tube 31. In order to achieve electrical isolation and avoid short circuit, an insulating member (not labelled) is sandwiched between the atomizing tube 31 and the first electrode 34, and the material of the insulating member includes, but is not limited to, silicone or rubber, etc. In the embodiment, the connecting seat 33 is connected with the atomizing tube 31 by threads, and it can be understood that in other embodiments not shown, the connecting seat 33 and the atomizing tube 31 can also be connected by a detachable way such as locking, clamping or magnetic connection.

Figure 4:
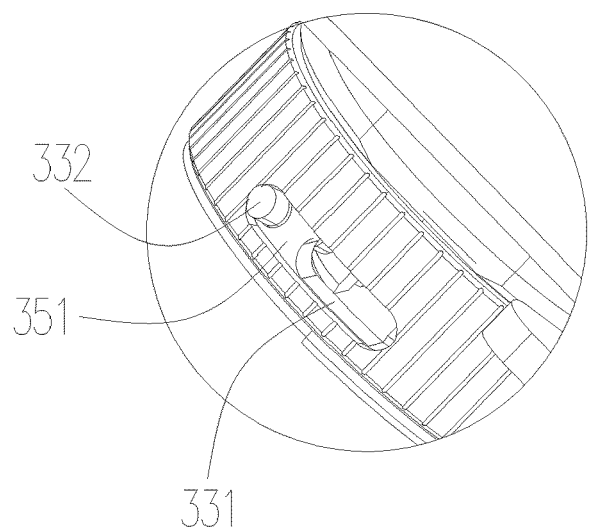
FIG. 4 is a partially enlarged view of the portion A in the electronic cigarette shown in FIG. 2.

Referring to FIG. 4, the adjusting member 35 is generally a hollow cylinder structure with openings at two ends. The side wall of the connecting seat 33 is provided with an air inlet hole 331, the air inlet hole 331 is communicated with the inner cavity of the connecting seat 33. The side wall of the adjusting member 35 is provided with an air adjusting hole 351, the air adjusting hole 351 corresponds to the air inlet hole 331 and is communicated with the external environment. By rotating the adjusting member 35, the communicating area between the air adjusting hole 351 and the air inlet hole 331 can be changed, so that the air intake amount can be adjusted to meet the user's needs. Further, a limiting post 332 is protruded out from the peripheral surface of the connecting seat 33 along the radial direction of the connecting seat 33, and the limiting post 332 passes through the air adjusting hole 351. When the adjusting member 35 is rotated relative to the connecting seat 33, the air adjusting hole 351 rotates relative to the limiting post 332. When the adjusting member 35 is rotated to cause the limiting post 332 to abut against one end of the air adjusting hole 351, the air inlet hole 331 and the air adjusting hole 351 are completely communicated with each other; when the adjusting member 35 is rotated to cause the limiting post 332 to abut against the other end of the air adjusting hole 351, the air inlet hole 331 is completely closed by the adjusting member 35. At this time, the external air cannot enter the electronic cigarette. By setting the limiting post 332, it is convenient for the user to adjust the air intake amount.

Referring to FIG. 3 again, when the atomizer 30 is connected with the liquid storage assembly 20, the upper end of the atomizer 30 is inserted into the connecting sleeve 23 from the lower end of the connecting sleeve 23. After the atomizer 30 is installed in place, the outer end surface of the sleeve pipe 32 abuts against the inner end surface of the connecting sleeve 23, the through hole defined at the top of the sleeve pipe 32 is communicated with the vent pipe 212, and the connecting seat 33 is partially received in the connecting sleeve 23 to seal the opening at the lower end of the connecting sleeve 23, to thereby effectively prevent the cigarette liquid in the liquid storage chamber 210 from leaking through the connecting sleeve 23 after passing through the liquid passing hole 232 of the connecting sleeve 23. In order to improve the sealing performance and prevent the leakage of the cigarette liquid, a sealing ring (not labelled) is arranged between the inner peripheral surface of the connecting sleeve 23 and the outer peripheral surface of the connecting seat 33, and between the inner end surface of the connecting sleeve 23 and the outer end surface of the sleeve pipe 32. The sealing ring is made of rubber, silicone, etc. In addition, in order to improve the connection stability between the atomizer 30 and the liquid storage assembly 20, the upper end surface of the sleeve pipe 32 extends upward along the axial direction of the sleeve pipe 32 to form a connecting portion 322, the connecting portion 322 is hollow with two ends being opened, and the inner cavity of the connecting portion 322 is communicated with the through hole defined at the top of the sleeve pipe 32. After the atomizer 30 is installed in place, the connecting portion 322 is inserted into the connecting tube 231 of the connecting sleeve 23 to limit the atomizer 30.

After the atomizer 30 and the liquid storage assembly 20 are installed in place, the liquid passing hole 232 is communicated with the liquid inlet hole 321, the cigarette liquid in the liquid storage chamber 210 enters the liquid inlet hole 321 through the liquid passing hole 232, and the cigarette liquid entering the liquid inlet hole 321 rapidly enters the atomizing chamber 310 under the absorption action of the liquid absorbing member and contacts with the heating member. When the battery device 40 drives the atomizer 30 to work, the heating member heats up, and the cigarette liquid generates smoke under the heating of the heating member. When the user inhales, the external gas enters into the atomizing chamber 310 through the air adjusting hole 351, the air inlet hole 331, the inner cavity of the connecting seat 33 and the inner cavity of the first electrode 34 in sequence and mixes with the smoke. Then, the gas mixed with the smoke enters into the user's mouth through the through hole, the vent pipe 212 and the smoke outlet hole 211 in sequence.

Figure 5:
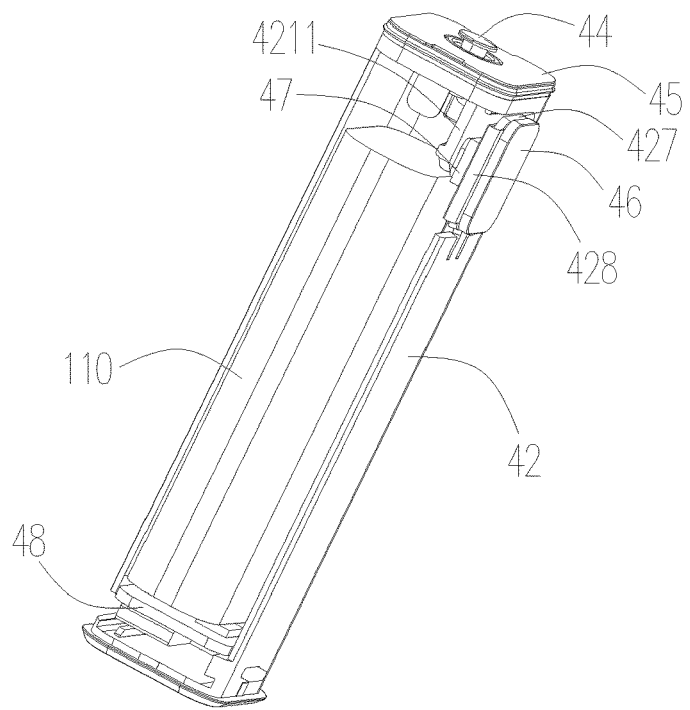
FIG. 5 is an isometric view of the battery device in the electronic cigarette shown in FIG. 2 (the battery shell is omitted)
Figure 6:
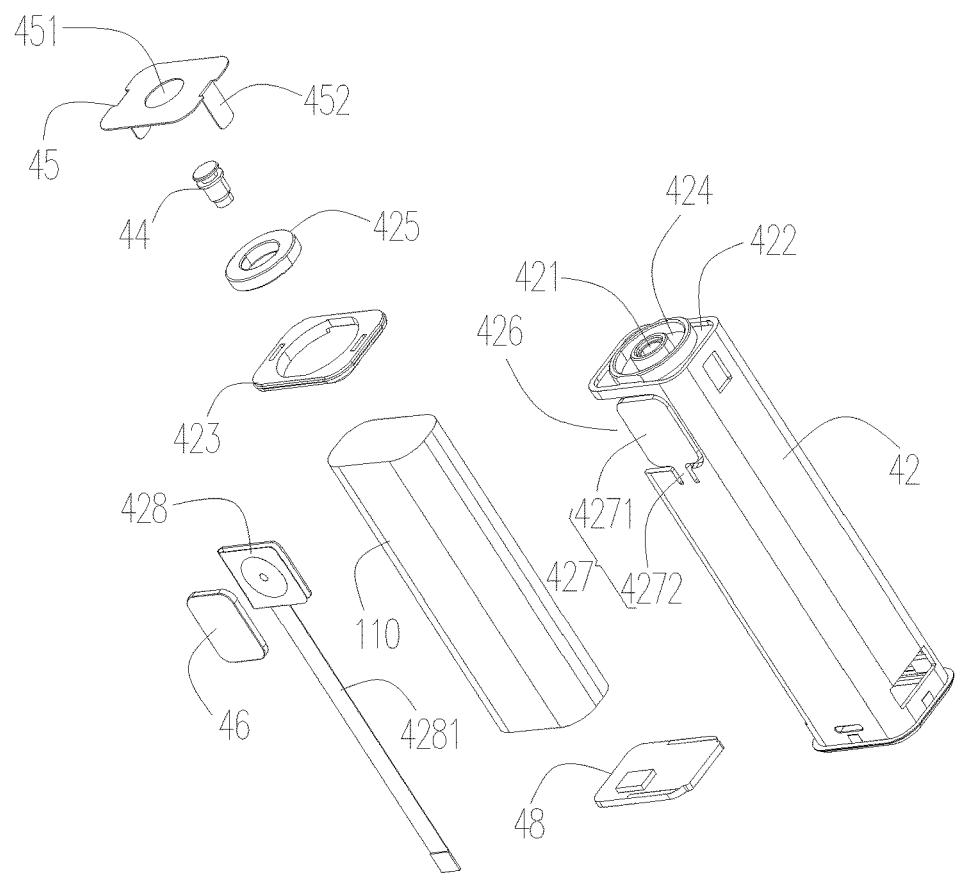
FIG. 6 is an exploded view of the battery device shown in FIG. 5.

Referring to FIG. 2, FIG. 5 and FIG. 6, the battery device 40 includes a battery shell 41 and a bracket 42, a battery assembly 110, a second electrode 44 and an electrode plate 45 received in the battery shell 41, wherein the battery assembly 110, the second electrode 44 and the electrode plate 45 are all installed on the bracket 42.

Figure 9:
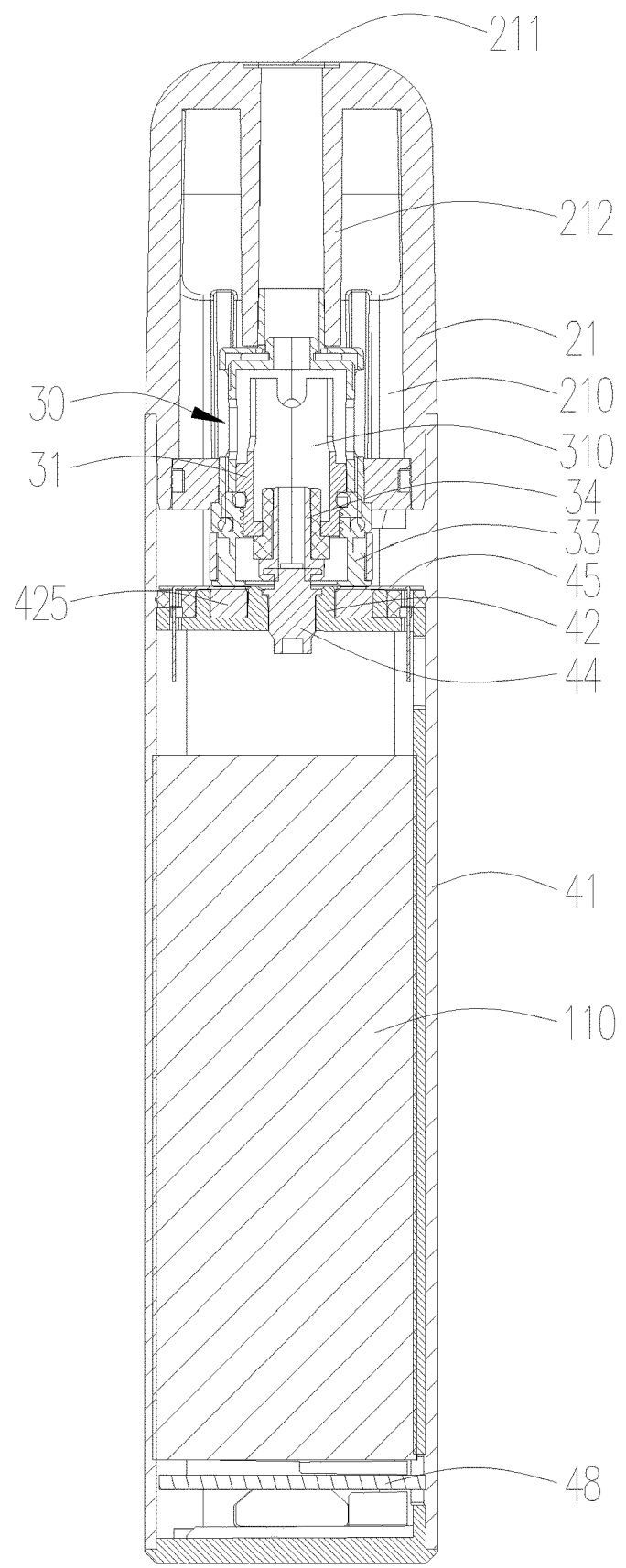
FIG. 9 is a cross-sectional view of the electronic cigarette shown in FIG. 1.
Figure 10:
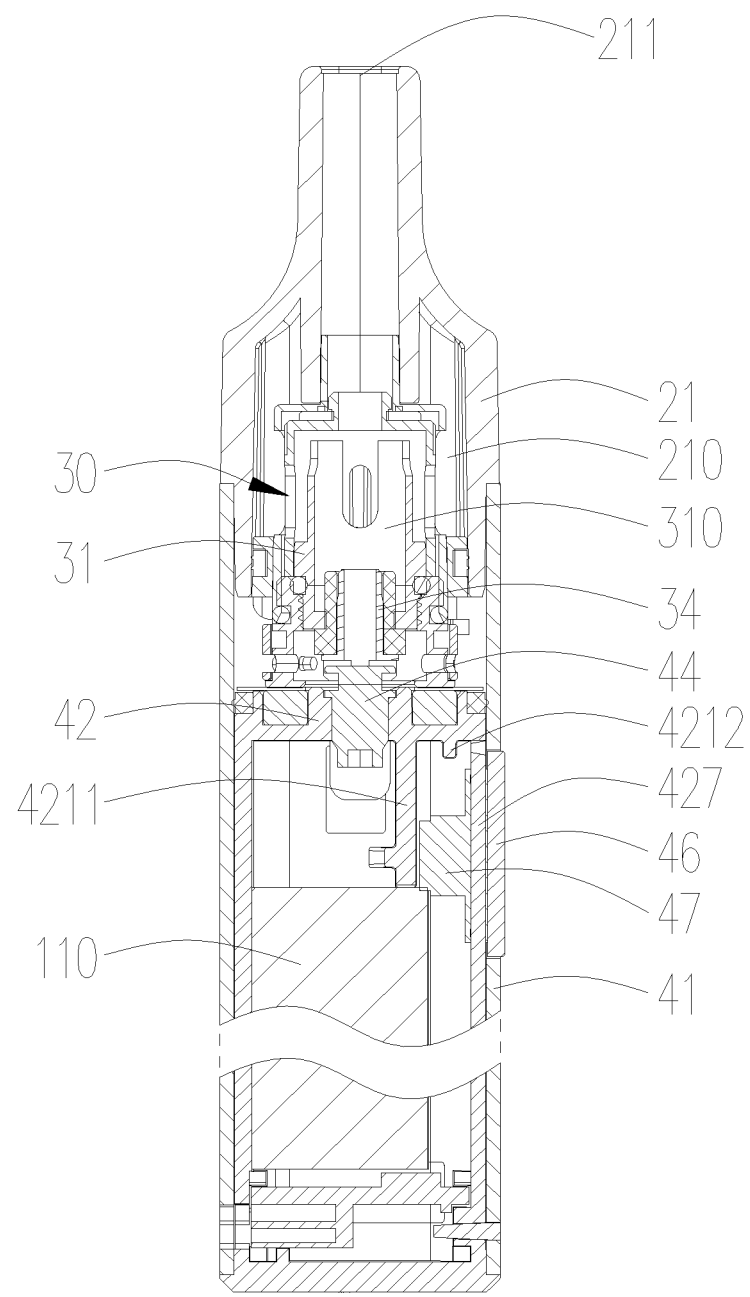
FIG. 10 is another cross-sectional view of the electronic cigarette shown in FIG. 1 (rotated 90° with respect to FIG. 9)

Referring to FIG. 9, the battery shell 41 is generally a hollow cylinder structure with openings at both ends, and the cartridge 50 can be connected with the battery shell 41 through the opening at the upper end of the battery shell 41. Specifically, the lower end of the cartridge case 21 is inserted into the opening of the upper end of the battery shell 41, thereby realizing the connection relationship between the cartridge 50 and the battery device 40. In addition, a gap is provided between the cartridge case 21 and the battery shell 41, and the gap is communicated with the external environment and the air adjusting hole 351, such that when the user carries out the inhaling operation, the external gas enters into the interior of the electronic cigarette through the gap. It can be understood that in other embodiments not shown, the cartridge 50 and the battery device 40 can also be connected in a detachable manner such as clamping connection, threaded connection or magnetic connection. When the cartridge 50 is installed in place, the adjusting member 35 is received in the battery shell 41, so that the battery shell 41 covers the adjusting piece 35 to make the whole more beautiful and prevent the adjusting member 35 from rotating by mistake.

Refer to FIG. 5 and FIG. 6 again, the bracket 42 is generally a hollow cylinder structure with two ends closed. One side wall of the bracket 42 is provided with a mounting gap (not labelled), and the battery assembly 110 is installed in the inner cavity of the bracket 42 through the mounting gap. The lower end of the bracket 42 closes the opening at the lower end of the battery shell 41. The upper end of the bracket 42, that is, the end of the bracket 42 close to the upper opening of the battery shell 41, is provided with a mounting hole 421, and the second electrode 44 is installed in the mounting hole 421. The electrode plate 45 generally has a plate-like structure, and is installed on one end of the bracket 42 close to the upper opening of the battery shell 41 and electrically isolated from the second electrode 44. One of the positive and negative electrodes of the battery assembly 110 is electrically connected with the second electrode 44, and the other one of the positive and negative electrodes of the battery assembly 110 is electrically connected with the electrode plate 45.

When the cartridge 50 and the battery device 40 are installed in place, the first electrode 34 and the second electrode 44 are in contact and electrically conductive, the connecting seat 33 and the electrode plate 45 are in contact and electrically conductive. At this time, when the electronic cigarette is started, the circuit between the battery assembly 110 and the heating member is turned on, and the heating member is electrically driven by the battery assembly 110 to heat, so that the cigarette liquid is heated by the heating member to generate smoke.

In the embodiment, the second electrode 44 is an elastic probe, so that when the cartridge 50 and the battery device 40 are installed in place, the second electrode 44 can deform under the push of the first electrode 34, so as to form an elastic abutting relationship between the second electrode 44 and the first electrode 34, thereby improving the contact stability and effectively avoiding the break of the first electrode 34 and the second electrode 44 due to poor contact. It can be understood that in other embodiments not shown, the second electrode 44 may also be a conductive element such as a stainless steel or copper sheet having elasticity and rigidity. A hole 451 is provided in the electrode plate 45. When the electrode plate 45 is connected with the bracket 42, the second electrode 44 can pass through the hole 451, so that the electrode plate 45 is disposed around the second electrode 44 and does not contact the second electrode 44, whereby the electrode plate 45 is electrically isolated from the second electrode 44, so as to effectively prevent short circuit. In addition, the lower surface of the electrode plate 45 protrudes with two pins 452 which are disposed oppositely. The pins 452 pass through the upper end of the bracket 42 to extend into the bracket 42. The electrode plate 45 is electrically connected with the battery assembly 110 through the pins 452, and the electrode plate 45 is installed on the bracket 42 through the pins 452. The electrode plate 45 is made of a conductive material such as stainless steel, copper, nickel, etc.

It should be noted that both the first electrode 34 and the second electrode 44 are coaxial with the electronic cigarette. Since the electrode plate 45 is disposed around the second electrode 44, when the user needs to connect the cartridge 50 with the battery device 40, the installation angle of the cartridge 50 relative to the battery device 40 is not required to be taken into account. Only by inserting the lower end of the cartridge 50 into the battery device 40, the electrode plate 45 can realize contact and electrical connection with the connecting seat 33, which is convenient for the user to install.

Further, in order to avoid the gas entering into the electronic cigarette through the gap between the cartridge case 21 and the battery shell 41 from entering into the inner cavity of the battery shell 41 and missing the air adjusting hole 351, the upper end surface of the bracket 42 is provided with a mounting groove 422. A sealing gasket 423 is installed in the mounting groove 422, and the outer peripheral surface of the sealing gasket 423 closely contacts with the inner peripheral surface of the battery shell 41, so as to effectively prevent the gas from entering the battery shell 41.

The material of the sealing gasket 423 include but is not limited to a sealing material such as silicone or rubber. At the same time, the upper end surface of the bracket 42 is also provided with a receiving groove 424. The mounting groove 422 surrounds the receiving groove 424, and the receiving groove 424 is disposed around the mounting hole 421. A magnetic member 425 is installed in the receiving groove 424. When the cartridge 50 and the battery device 40 are installed in place, the magnetic member 425 has a magnetic adsorption effect to the connecting seat 33, so as to prevent the cartridge 50 and the battery device 40 from easily detaching. In the embodiment, the magnetic member 425 is a magnet. In addition, when the electrode plate 45 is installed in place, the electrode plate 45 covers the sealing gasket 423 and the magnetic member 425, so as to fix and cover the sealing gasket 423 and the magnetic member 425.

Referring to FIG. 6, FIG. 8 and FIGS. 10-12, the battery device 40 further includes a touch key 46, a mechanical key 47 and a control board 48. The touch key 46, the mechanical key 47 and the battery assembly 110 are all electrically connected with the control board 48. The control board 48 is installed in the battery shell 41. An inserting groove (not labelled) is provided in the bracket 42 near the lower end of the bracket 42 on two neighboring side walls adjacent to the mounting gap. The control board 40 is inserted in the inserting groove after passing the mounting gap. When a human or a conductor touches or presses the touch key 46, the touch key 46 generates a sensing signal and feeds the sensing signal to the control board 48. When the mechanical key 47 is pressed, the mechanical key 47 generates a load working signal and feeds the load working signal to the control board 48. When the control board 48 receives simultaneously the sensing signal and the load working signal, the circuit between the battery assembly 110 and the cartridge 50 is in the turned-on state, so that the battery assembly 110 can supply power to the cartridge 50 to drive the cartridge 50 to work and atomize the cigarette liquid. When the control board 48 neither receives the sensing signal nor the load working signal, or receives only one of the sensing signal and the load working signal, that is, when the control board 48 receives at most one of the sensing signal and the load working signal, the circuit between the battery assembly 110 and the cartridge 50 is in the turned-off state, and the battery assembly 110 is unable to supply power to the cartridge 50, and the cartridge 50 cannot work. Specifically, in the electronic cigarette, there is provided with an atomizing circuit 140 which is electrically connected with the control board 48. When the control board 48 receives simultaneously the sensing signal and the load working signal, the control board 48 controls the atomizing circuit 140 to be turned on. When the control board 48 neither receives the sensing signal nor the load working signal, or receives only one of the sensing signal and the load working signal, the control board 48 controls the atomizing circuit 140 to be turned off. The atomizing circuit 140 refers to the circuit for controlling the heating member. In this embodiment, the control board 48 is provided with a main control circuit 150. When receiving the sensing signal and the load working signal, the main control circuit 150 controls the conduction between the battery assembly 110 and the atomizing circuit 140 according to the sensing signal and the load working signal, so that the battery assembly 110 can supply power to the atomizing circuit 140.

When the touch key 46 is triggered by touch operation, the touch key 46 generates a sensing signal through the detected biological information including but not limited to fingerprint, biological current or body temperature, etc. When the touch key 46 is triggered by touch and/or press operation, the touch key 46 generates a sensing signal by sensing the change of capacitance or resistance, and the touch key 46 may be a capacitive touch key or a resistive touch key. From above, when the human or conductor releases the touch or press operation of the touch key 46, the sensing signal generated by the touch key 46 is disappeared. The touch key 46 includes a touch pad and a touch chip. The mechanical key 47 is a switch with on/off function. When the mechanical key 47 is pressed, the mechanical key 47 is in a closed state, and the mechanical key 47 generates a load working signal. When the mechanical key 47 is released, the mechanical key 47 restores under the action of an elastic element (not shown) inside the mechanical key 47, the mechanical key 47 is in an opened state, and the load working signal generated by the mechanical key 47 is disappeared.

Referring to FIG. 6 again, in this embodiment, a penetrating groove 426 is provided near the upper end of the bracket 42 in a neighboring side wall adjacent to the mounting gap of the bracket 42. The penetrating groove 426 penetrates the inner and outer surfaces of the side wall of the bracket 42. The battery device 40 further includes a deformable member 427 which is installed in the penetrating groove 426. When the deformable member 427 is pressed inward, the deformable member 427 deforms and moves towards the inner cavity of the bracket 42. When the deformable member 427 is released, the deformable member 427 restores under its own elastic force. Specifically, the deformable member 427 includes a pressing portion 4271 and a connecting portion 4272. One end of the connecting portion 4272 is connected with the groove wall of the penetrating groove 426, the other end of the connecting portion 4272 is connected with the pressing portion 4271, and the width of the connecting portion 4272 is smaller than the width of the pressing portion 4271. When pressing the deformable member 427, the connection part 4272 with relatively small width is more easier to deform than the pressing portion 4271. The pressing portion 4271 can move when the connection part 4272 deforms, thus realizing the overall deformation of the deformable member 427, which is convenient for the user to operate. In the embodiment, the deformable member 427 and the bracket 42 are formed into an integral structure. It can be understood that in other embodiments not shown, the connection part 4272 can also be omitted. At this time, the deformable member 427 is constituted by the pressing portion 4271, and the pressing portion 4271 is connected with the groove wall of the penetrating groove 426. In order to facilitate the movement of the deformable member 427 relative to the bracket 42, a gap exists between the deformable member 427 and the groove wall of the penetrating groove 426.

The battery device 40 further includes a key mounting member 428 used for enveloping the pressing portion 4271 of the deformable member 427. Specifically, the key mounting member 428 is generally U-shaped, with a slot (not labelled) defined therein for allowing the pressing portion 4271 to insert into the slot. When installing the key mounting member 428, it is only necessary to insert the key mounting member 428 into the outside of the pressing portion 4271 through the opening at one side of the penetrating groove 426, so the operation is simple and convenient. The touch key 46 and the mechanical key 47 are mounted on opposite sides of the key mounting member 428, wherein the touch key 46 is located on the outside of the key mounting member 428 and the mechanical key 47 is located on the inside of the key mounting member 428. The key mounting member 428 is provided with a wiring 4281. The touch key 46 and the mechanical key 47 are electrically connected with one end of the wiring 4281, and the other end of the wiring 4281 is electrically connected with the control board 48, so as to realize the electrical connection between the touch key 46 and the control board 48, and between the mechanical key 47 and the control board 48.

Figure 7:
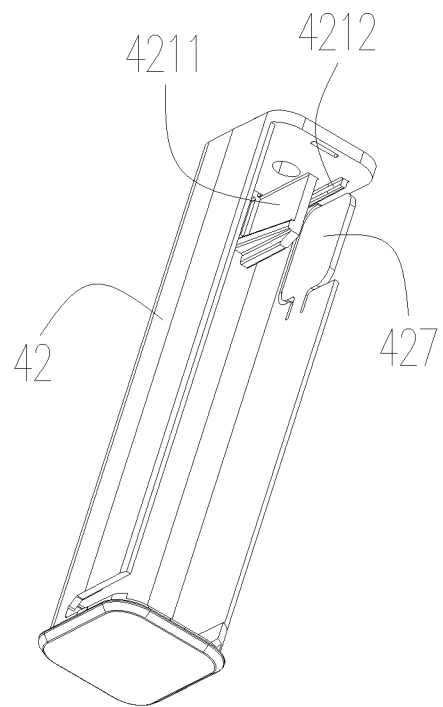
FIG. 7 is an isometric view of the bracket in the battery device shown in FIG. 6.
Figure 8:
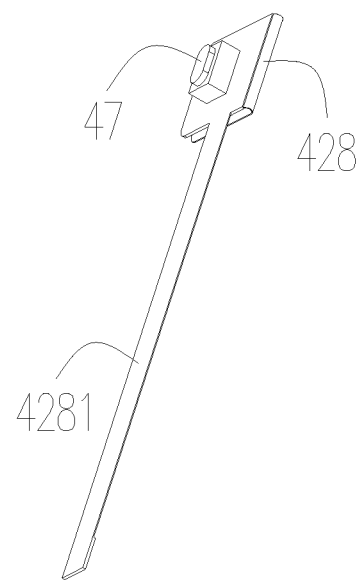
FIG. 8 is a schematic view of the mechanical key and the key mounting member in the battery device shown in FIG. 6.

Further, referring to FIG. 7, the inner wall of the bracket 42 is provided with a limiting plate 4211. The limiting plate 4211 corresponds to the mechanical key 47 and is located on the movement path of the deformable member 427. The limiting plate 4211 acts as a resisting member. When the user contacts and presses the touch key 46 using his finger, the touch key 46 drives the deformable member 427 to deform and move inwards, and then drives the mechanical key 47 to move towards the limiting plate 4211, such that the mechanical key 47 is abutted against the limiting plate 4211 so as to be closed, the mechanical key 47 generates the load working signal and feeds the load working signal to the control plate 48. At the same time, because the user's finger is in contact with the touch key 46, the touch key 46 detects the biological information or the change of capacitance or resistance, and generates a sensing signal and feeds the sensing signal to the control board 48. When the control board 48 receives simultaneously the sensing signal and the load working signal, the control board 48 controls the battery assembly 110 to supply power to the cartridge 50 to cause the cartridge 50 to atomize the cigarette liquid. It can be understood that in other embodiments not shown, the limiting plate 4211 can also be omitted, at this case, the mechanical key 47 is driven by the deformable member 427 to abut against the outer wall of the battery assembly 110, thereby triggering the mechanical key 47. In addition, the inner wall of the support 42 is further provided with a blocking portion 4212. The blocking portion 4212 is located between the limiting plate 4211 and the deformable member 427. The blocking portion 4212 is used to limit the movement stroke of the deformable member 427. Specifically, when the deformable member 427 is resisted on the blocking portion 4212, the deformable member 427 can no longer move inwards. At this time, the deformable member 427 moves in place, that is, the user presses the touch key 46 to operate in place. When the finger of the user is released from the touch key 46, the touch key 46 cannot detect the biological information, or the resistance or capacitance of the touch key 46 is restored, so that the sensing signal is disappeared, and the deformable member 427 restores after the pressure of the finger is removed, the mechanical key 47 is driven by the deformable member 427 to separate from the limiting plate 4211. An elastic element is arranged in the mechanical key 47, and the mechanical key 47 is reset and disconnected under the action of the elastic element.

It should be noted that the side wall of the battery shell 41 is provided with a passing groove (not labelled). When the bracket 42 is received in the interior of the battery shell 41, the touch key 46 is located in the passing groove or partially extends to the outside of the battery shell 41 from the passing groove, so as to facilitate the user's pressing operation to the touch key 46.

In the embodiment, the touch key 46 and the mechanical key 47 are arranged on opposite sides of the key mounting member 428, so that the user can realize the start-up function of the electronic cigarette only by pressing once, and the operation is simple and convenient. It can be understood that in other embodiments not shown, the touch key 46 and the mechanical key 47 can also be arranged in different positions, at this case, the deformable member 427 can be omitted, and the touch key 46 and the mechanical key 47 can be arranged on the outside of the battery shell 41. In use, the user needs to touch or press the touch key 46 to trigger the touch key 46, and simultaneously press the mechanical key 47 to also trigger the mechanical key 47 in order to start up the electronic cigarette. The control board 48 receives simultaneously both the sensing signal and the load working signal, it means that the control board 48 receives both the sensing signal and the load working signal at the same time, or the control board 48 receives the sensing signal and then receives the load working signal before the sensing signal is disappeared, or the control board 48 receives the load working signal and then receives the sensing signal before the load working signal is disappeared. It can be understood that in other embodiments not shown, a preset time can be set. After the control board 48 receives the sensing signal, it starts timing, and if the control board 48 can receive the load working signal within the preset time, the control board 48 controls the battery assembly 110 to supply power to the cartridge 50, or after the control board 48 receives the load working signal, it starts timing, and if the control board 48 can receive the sensing signal within the preset time, the control board 48 controls the battery assembly 110 to supply power to the cartridge 50. The preset time can be 5S. Therefore, as long as the control board 48 can receive the sensing signal and the load working signal, the receiving time of the two signals may be different.

It can be understood that in other embodiments not shown, the touch key 46 and the mechanical key 47 can adopt other configurations, as long as the mechanical key 47 can be operated through the touch key 46 when the user operates the touch key 46. Specifically, the touch key 46 can be movably arranged on the battery device 40, the mechanical key 47 is arranged on the moving path of the touch key 46, the battery device 40 further includes a resisting member, the resisting member is also arranged on the moving path of the touch key 46, when the touch key 46 is activated, the touch key 46 drives the mechanical key 47 to move, so that the mechanical key 47 abuts against the resisting member to cause the mechanical key 47 to be closed, or when the touch key 46 is activated, the touch key 46 drives the resisting member to move, so that the resisting member abuts against the mechanical key 47 to cause the mechanical key 47 to be closed. In a specific embodiment, the touch key 46 moves along the axial direction of the electronic cigarette.

In a specific embodiment, a resisting member is provided on one side of the key mounting member 428 opposite to the touch key 46, the mechanical key 47 is installed on the limiting plate 4211, when the touch key 46 is pressed, the touch key 46 drives the resisting member to move, so that the resisting member resists on the mechanical key 47 to cause the mechanical key 47 to be closed. In a specific embodiment, the resisting member can also be omitted, at this case, when the touch key 46 is pressed, the touch key 46 moves and directly resists on the mechanical key 47, to cause the mechanical key 47 to be closed.

In this embodiment, taking an atomizer as a cartridge and an aerosol forming substrate as the cigarette liquid as an example, it can be understood that in other embodiments not shown, other types of atomizer and other types of aerosol forming substrate can also be used. The optional aerosol forming substrate includes tobacco paste, tobacco silks or tobacco leaves. The type of atomizer is selected to be suitable for the type of aerosol forming substrate.

In the electronic cigarette provided by the present invention, only when the control board 48 receives the sensing signal and the load working signal simultaneously, the circuit between the battery assembly 110 and the atomizing circuit 140 is in the turned-on state, which can effectively prevent the non-human and the insulator from mistakenly triggering the operation of the electronic cigarette, so that the use is safe and convenient.

Figure 11:
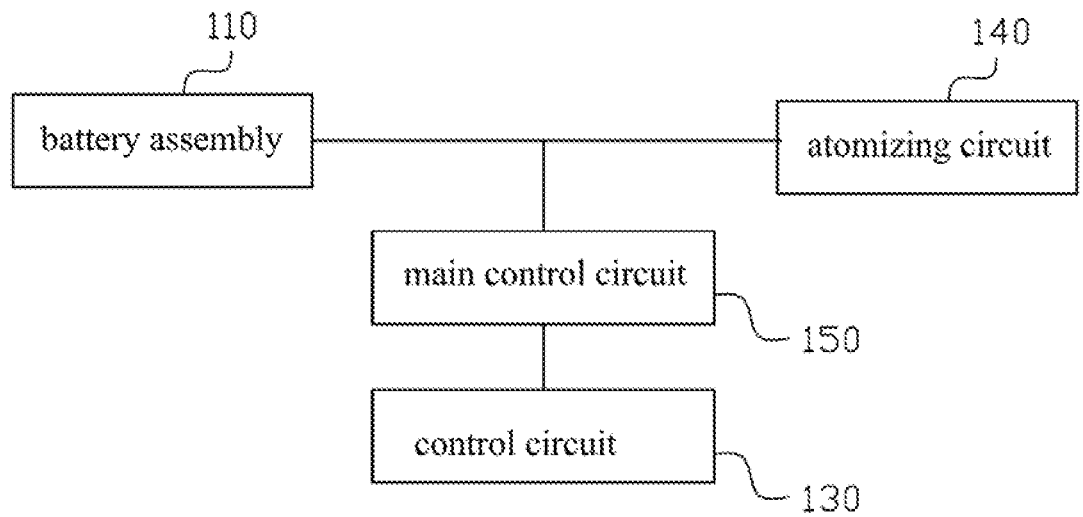
FIG. 11 is a block diagram of a voltage output circuit provided in one embodiment of the present invention.

Referring to FIG. 11, a voltage output circuit provided by one embodiment of the present invention is shown. As shown in FIG. 11, the voltage output circuit includes a battery assembly 110 and a control circuit 130.

The battery assembly 110 is electrically connected with the atomizing circuit 140.

The first signal output end 170 of the control circuit 130 is connected with the main control circuit 150, and the second signal output end 180 of the control circuit 130 is connected with the main control circuit 150.

When the main control circuit 150 receives the sensing signal output by the first signal output end 170 and the load working signal output by the second signal output end 180, the main control circuit 150 controls the conduction between the battery assembly 110 and the atomizing circuit 140 to cause the battery assembly 110 to supply power to the atomizing circuit 140, such that the atomizing circuit 140 starts to work.

Figure 12:
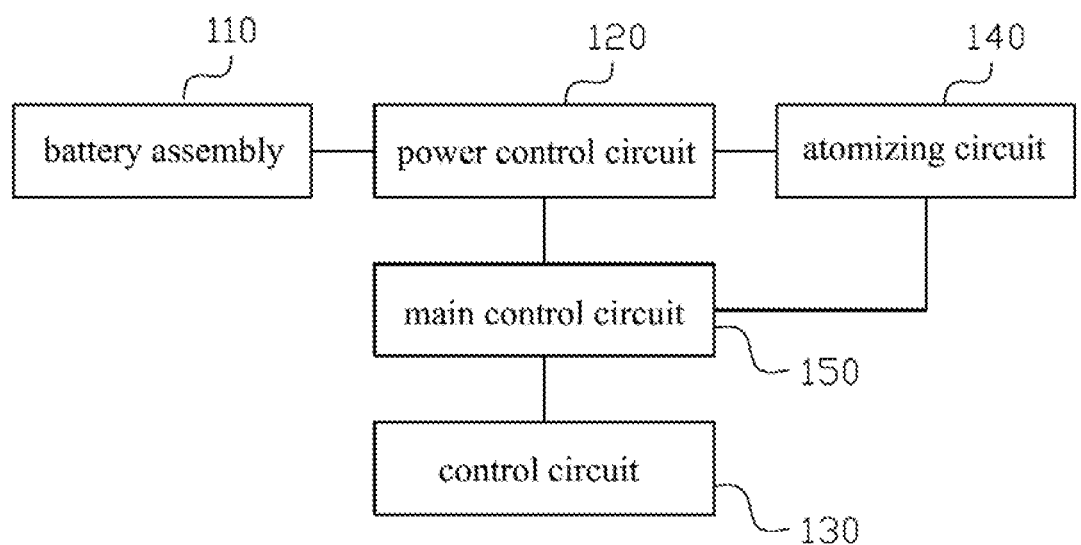
FIG. 12 is a block diagram of a voltage output circuit provided in another embodiment of the present invention.

Optionally, as shown in FIG. 12, the voltage output circuit further includes a power control circuit 120, wherein the positive pole of the battery assembly 110 is connected with the negative pole of the battery assembly 110 through the power control circuit 120, and the battery assembly 110 is connected with the atomizing circuit 140 through the power control circuit 120. When the power control circuit 120 detects that the battery assembly 110 is abnormal, the power control circuit 120 disconnects the battery assembly 110 from the voltage output circuit, so that the battery assembly cannot continue to supply power, so as to protect the circuits in the electronic device. The abnormality of the battery assembly 110 includes overcharge, over discharge and short circuit of the battery assembly 110. The specific realization can be as follows: when the power control circuit 120 detects overcharge, over discharge or short circuit of the battery assembly 110, the circuit in the power control circuit 120 connected between the positive and negative poles of the battery assembly 110 is disconnected, thus the connection between the battery assembly 110 and the voltage output circuit is disconnected, so that the battery assembly 110 cannot continue to supply power.

Optionally, the sensing signal of the present invention is the signal generated when the touch chip detects that the touch pad is touched by the human.

Optionally, the battery assembly of the present invention may include a rechargeable battery or a non-rechargeable battery, which is not limited in the embodiment. The types of battery in the battery assembly can be rechargeable or non-rechargeable batteries that can provide electric energy, such as lithium batteries, alkaline dry batteries, nickel hydrogen batteries, lead-acid batteries, iron nickel batteries, metal oxide batteries, zinc silver batteries, zinc nickel batteries, hydrogen oxygen fuel cells, solar cells, etc.

Optionally, the battery assembly may include one or more batteries, and may also include peripheral circuits. The peripheral circuits may be designed for the protection of the batteries in the battery assembly, or for the switching of the number of batteries in work from multiple batteries, or for the switching of the series or parallel connection mode of the batteries, which is not limited in the embodiment.

In summary, the voltage output circuit provided by the embodiment of the present invention includes a battery assembly and a control circuit, wherein the battery assembly is electrically connected with the atomizing circuit; the first signal output end of the control circuit is connected with the main control circuit, and the second signal output end of the control circuit is connected with the main control circuit; when the main control circuit receives the sensing signal output by the first signal output end and the load working signal output by the second signal output end, the main control circuit controls the battery assembly to supply power to the atomizing circuit and the atomizing circuit starts to work, thereby solving the problem that the mechanical key is easy to be triggered by non-human in the related art to cause potential safety hazards, and achieving the effect of improving the safety of the electronic device using the voltage output circuit.

Figure 13:
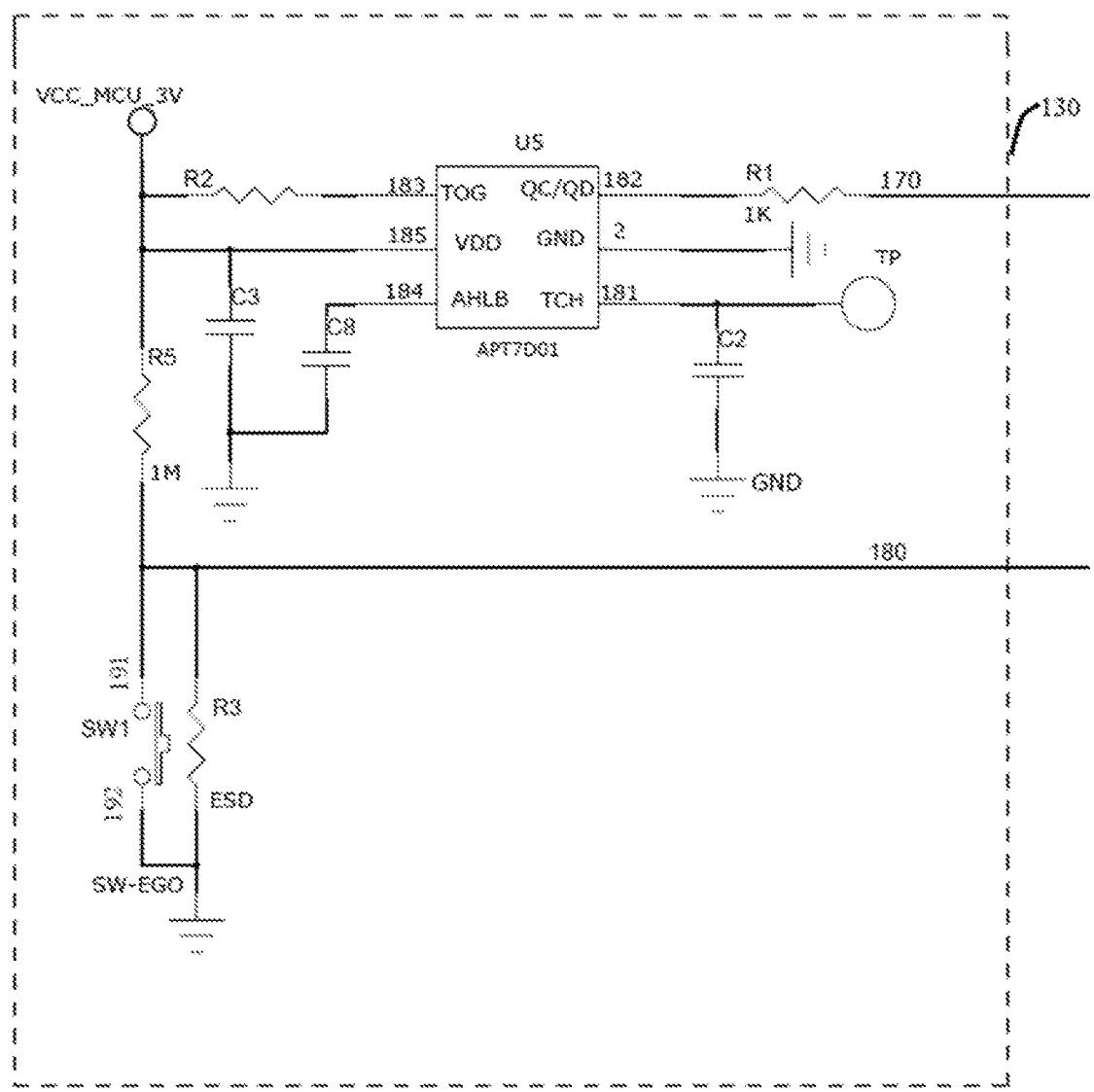
FIG. 13 is a circuit diagram of a control circuit provided in one embodiment of the present invention.

Optionally, referring to FIG. 13, the control circuit 130 includes touch chip U5. The touch chip U5 includes touch input terminal 181, touch signal output terminal 182 and synchronization/holding mode configuration terminal 183. The touch signal output terminal 182 is the first signal output end 170. The synchronization/holding mode configuration terminal 183 is electrically connected with system power source VCC MCU 3V. The touch input terminal 181 is connected with the touch pad.

In one example, the touch signal output terminal 182 is connected with an I/O port of the main control circuit 150 through a signal anti-interference coupling resistance R1. In practice, the touch signal output terminal 182 can be the QC/QD pin of the touch chip U5. When the user generates a touch operation on the touch pad, the touch signal output terminal 182 provides a low level pulse to the I/O port of the main control circuit 150. When the I/O port of the main control circuit 150 electrically connected with the touch signal output terminal 182 receives a low level pulse, it is determined that the sensing signal is received.

In one example, the touch input terminal 181 is grounded by an adjusting capacitance C2 having a first sensitivity. In practice, the touch input terminal 181 may be the TCH pin of the touch chip U5.

In one example, the synchronization/holding mode configuration terminal 183 is connected to the system power source VCC MCU 3V through a first pull-up resistor R2. In practice, the synchronization/holding mode configuration terminal 183 can be the TOG pin of the touch chip U5.

Optionally, still referring to FIG. 13, the touch chip U5 further includes an output effective level configuration terminal 184 and a power source terminal 185, wherein the output effective level configuration terminal 184 is grounded through an adjusting capacitor C3 having a second sensitivity, and/or the output effective level configuration terminal 184 is grounded through a filter capacitor C8.

In practice, the output effective level configuration terminal 184 can be the AHLB pin of the touch chip U5, the power source terminal 185 can be the VDD pin of the touch chip U5, and the GND pin of the touch chip U5 is grounded.

In practice, the touch chip U5 can be the model of APT7D01.

Still referring to FIG. 13, the control circuit 130 includes a mechanical key SW1, wherein the first end 191 of the mechanical key SW1 is electrically connected with the system power source VCC MCU 3V, the first end 191 is the second signal output end 180, the first end 191 is connected with an I/O port of the main control circuit 150, and the second end 192 of the mechanical key SW1 is grounded.

In one example, the first end 191 of the mechanical key SW1 is connected with the system power source VCC MCU 3V through a second pull-up resistance R5; and/or, the first end 191 of the mechanical key SW1 is grounded through an anti-interference resistance R3. The anti-interference resistance R3 provides the anti-interference function for the mechanical key SW1 and prevents the mechanical key SW1 from triggering to generate high level pulse. When the mechanical key SW1 is pressed, a low level pulse is provided to the main control circuit 150. When the I/O port of the main control circuit 150 connected with the mechanical key SW1 receives a low level pulse, it is determined that the main control circuit 150 receives the load working signal.

The present invention takes the example when the mechanical key is pressed to generate the operation signal as the load working signal. In actual practice, the load working signal can be the signal generated by other methods, for example, the load working signal is the signal when the pressure value of the mechanical key being pressed reaches a predetermined value.

It should be noted that for the electronic device using the voltage output circuit, the user needs not to switch on/off the electronic device, but can use the electronic device by holding it directly, avoiding non-human operation caused by mistakenly touching the mechanical key, and facilitating the user to switch on/off the electronic device.

In actual practice, the electronic device can also switch on/off. The specific realization can be as follows: in the shutdown state, when the main control circuit 150 detects the power-on signal generated by the operation of the mechanical key SW1 through the control circuit 130, the electronic device starts up; in the startup state, when the main control circuit 150 detects the power-off signal generated by the operation of the mechanical key SW1 through the control circuit 130, the electronic device shuts down. The power-on signal and the power-off signal can be set by the developer or customized by the user. For example, the power-on signal and the power-off signal can be the operation signal generated by continuous short press of the mechanical key SW1 for 5 times.

In practice, the touch pad and the mechanical key in the voltage output circuit can be set close to each other so that the user can touch the touch pad while pressing the mechanical key. For example, the mechanical key can be set on the touch pad (for example, set in the center of the touch pad). Of course, the area commonly touched by the finger in lighting the electronic cigarette can be determined as the area to set the touch pad. In this embodiment, the positions of the mechanical key and the touch pad on the electronic cigarette are not specifically limited.

When the voltage output circuit is applied to an electronic cigarette, the user of the electronic cigarette needs to press the mechanical key and touch the touch pad simultaneously in order to trigger the battery assembly to supply power to the atomizing circuit, so that the atomizer in the atomizing circuit atomizes the aerosol forming substrate to generate smoke.

Optionally, the battery assembly 110 is further connected with a charging circuit through the power control circuit 120. The electric energy provided by the external power source can be charged to the battery assembly 110 through the charging circuit and the power control circuit 120.

The charging circuit is further connected with the main control circuit 150 through the power control circuit 120. When the electric energy provided by the external power source is transmitted to the battery assembly 110 through the charging circuit and the power control circuit 120, the electric energy provided by the external power source is further provided to the main control circuit 150 through the charging circuit and the power control circuit 120.

The present invention further provides an electronic device including the voltage output circuit according to any of the above embodiments.

The present invention further provides an electronic cigarette, which includes a main control circuit 150, an atomizing circuit 140 and a voltage output circuit. The load in the atomizing circuit 140 is an atomizer, and the voltage output circuit includes a battery assembly 110 and a control circuit 130, wherein:

The battery assembly 110 is electrically connected with the atomizing circuit 140.

The first signal output end 170 of the control circuit 130 is connected with the main control circuit 150, and the second signal output end 180 of the control circuit 130 is connected with the main control circuit 150.

When the main control circuit 150 receives the sensing signal output by the first signal output end 170 and the load working signal output by the second signal output end 180, the main control circuit 150 controls the battery assembly 110 to supply power to the atomizing circuit 140, such that the atomizing circuit 140 starts to work.

Optionally, the atomizer includes a liquid storage chamber for storing the cigarette liquid and an atomizing assembly for atomizing the cigarette liquid. The battery assembly 110 is electrically connected with the atomizing assembly through the atomizing circuit 140. Optionally, the upper end of the electronic cigarette is further provided with a mouthpiece, the mouthpiece is connected with the atomizing chamber, and the user of the electronic cigarette can inhale through the mouthpiece.

The terms "first" and "second" are used for descriptive purposes only and cannot be deemed as indicating or implying relative importance or the number of technical features. Thus, the defined "first" and "second" features may explicitly or implicitly include one or more such features. In the description of the present invention, unless otherwise stated, "multiple" means two or more.

Those of ordinary skill in the art can understand that all or part of the steps to realize the above embodiments can be completed by hardware, or can be instructed to complete by programs. The programs can be stored in a computer-readable storage medium, which can be read-only memory, magnetic disk or optical disk, etc.

The above are only the preferred embodiments of the present invention, and are not intended to limit the present invention. Any modifications, equivalents, improvements, etc., which are within the scope of the present invention, should be included in the protection scope of the present invention.

What is claimed is:

1. A battery device for being electrically connected with a cartridge to form an electronic cigarette so as to supply power to the cartridge to drive the cartridge to work and atomize a cigarette liquid when the electronic cigarette is in use, an atomizing circuit being provided in the electronic cigarette, the battery device comprising a touch key, a mechanical key, a battery assembly and a control board, wherein the atomizing circuit, the touch key, the mechanical key and the battery assembly are all electrically connected with the control board, the touch key is configured to generate a sensing signal and feed the sensing signal to the control board, the mechanical key is configured to generate a load working signal and feed the load working signal to the control board, when the control board receives both the sensing signal and the load working signal, the control board controls the conduction between the atomizing circuit and the battery assembly to cause the battery assembly to supply power to the atomizing circuit such that the atomizing circuit starts to work.

2. A voltage output circuit for use with the battery device according to claim 1, comprising the battery assembly and a control circuit, wherein:
the battery assembly is electrically connected with the atomizing circuit;
a first signal output end of the control circuit is connected with a main control circuit, and a second signal output end of the control circuit is connected with the main control circuit;
when the main control circuit receives a sensing signal output by the first signal output end and a load working signal output by the second signal output end, the main control circuit controls the battery assembly to supply power to the atomizing circuit, such that the atomizing circuit starts to work.

3. The voltage output circuit of claim 2, wherein the voltage output circuit further comprises a power control circuit, wherein:
a positive pole of the battery assembly is connected with a negative pole of the battery assembly through the power control circuit;
the battery assembly is connected with the atomizing circuit through the power control circuit;
when the power control circuit detects that the battery assembly is abnormal, the power control circuit disconnects the battery assembly from the voltage output circuit.

4. The voltage output circuit of claim 2, wherein the control circuit includes touch chip, the touch chip comprises a touch input terminal, a touch signal output terminal and a synchronization/holding mode configuration terminal, the touch signal output terminal is the first signal output end, wherein:
the synchronization/holding mode configuration terminal is electrically connected with a system power source;
the touch input terminal is connected with a touch pad.

5. The voltage output circuit of claim 2, wherein the control circuit comprises the mechanical key, wherein:
a first end of the mechanical key is electrically connected with a system power source, the first end is the second signal output end, and a second end of the mechanical key is grounded.

6. An electronic device, comprising the voltage output circuit according to claim 2.

7. An electronic cigarette for use with the battery device according to claim 1, comprising a main control circuit, the atomizing circuit and a voltage output circuit, wherein a load in the atomizing circuit is an atomizer, the voltage output circuit comprises the battery assembly and a control circuit, wherein:
the battery assembly is electrically connected with the atomizing circuit;
a first signal output end of the control circuit is connected with the main control circuit, and a second signal output end of the control circuit is connected with the main control circuit;
when the main control circuit receives a sensing signal output by the first signal output end and a load working signal output by the second signal output end, the main control circuit controls the battery assembly to supply power to the atomizing circuit, such that the atomizing circuit starts to work.

8. The battery device of claim 1, wherein the control board receives both the sensing signal and the load working signal, it means that:
the control board receives the sensing signal and the load working signal at the same time; or
the control board receives the sensing signal and then receives the load working signal before the sensing signal is disappeared; or
the control board receives the load working signal and then receives the sensing signal before the load working signal is disappeared; or
after the control board receives the sensing signal, it starts timing, and the control board receives the load working signal within a preset time; or
after the control board receives the load working signal, it starts timing, and the control board receives the sensing signal within a preset time.

9. The battery device of claim 1, wherein when detecting a biological information, the touch key generates the sensing signal; or when detecting the change of capacitance or resistance of the touch key, the touch key generates the sensing signal; when the mechanical key is in a closed state, the mechanical key generates the load working signal.

10. The battery device of claim 9, wherein the biological information is fingerprint, biological current, or body temperature.

11. The battery device of claim 1, wherein the touch key is movably arranged on the battery device, the mechanical key is arranged on the moving path of the touch key, the battery device further includes a resisting member, the resisting member is also arranged on the moving path of the touch key, when the touch key is activated, the touch key drives the mechanical key to move, so that the mechanical key abuts against the resisting member to cause the mechanical key to be closed, or when the touch key is activated, the touch key drives the resisting member to move, so that the resisting member abuts against the mechanical key to cause the mechanical key to be closed.

12. The battery device of claim 11, wherein the battery device comprises a bracket and a deformable member, the battery assembly is installed in an inner cavity of the bracket, the deformable member is provided on the bracket, the touch key and the mechanical key are arranged on opposite sides of the deformable member, the touch key is located in the inner cavity of the bracket and the mechanical key is located outside the bracket, pressing the touch key can cause the deformable member to deform and move towards the inner cavity of the bracket, and the mechanical key is driven by the deformable member to move towards the inner cavity of the bracket.

13. The battery device of claim 12, wherein an inner wall of the bracket is provided with a limiting plate and a blocking portion, the limiting plate acts as the resisting member, the blocking portion is located between the limiting plate and the deformable member, when the deformable member moves to resist on the blocking portion, the mechanical key abuts against the limiting plate to cause the mechanical key to be closed.

14. The battery device of claim 12, wherein a penetrating groove is provided in a side wall of the bracket, the deformable member is disposed in the penetrating groove, the deformable member comprises a pressing portion and a connecting portion, one end of the connecting portion is connected with a groove wall of the penetrating groove, the other end of the connecting portion is connected with the pressing portion, and the width of the connecting portion is smaller than the width of the pressing portion.

15. The battery device of claim 14, wherein the battery device further comprises a key mounting member used for enveloping the pressing portion of the deformable member, the key mounting member is provided with a wiring, the touch key and the mechanical key are mounted on opposite sides of the key mounting member, the touch key and the mechanical key are electrically connected with the control board by the wiring.

16. The battery device of claim 12, wherein the battery device further comprises a battery shell, the bracket and the control board are received in the battery shell, a side wall of the battery shell is provided with a passing groove, the touch key is located in the passing groove or partially extends to the outside of the battery shell from the passing groove.

17. The battery device of claim 12, wherein the battery device further comprises a second electrode and an electrode plate, the second electrode and the electrode plate are installed to one end surface of the bracket, the electrode plate is disposed around the second electrode, one of positive and negative electrodes of the battery assembly is electrically connected with the second electrode, and the other one of the positive and negative electrodes of the battery assembly is electrically connected with the electrode plate.

18. The battery device of claim 17, wherein the battery device further comprises a sealing gasket and a magnetic member, the bracket is provided with a mounting groove and a receiving groove in one end surface to which the second electrode and the electrode plate are installed, the mounting groove surrounds the receiving groove, the sealing gasket is installed in the mounting groove, the magnetic member is installed in the receiving groove, the electrode plate covers the sealing gasket and the magnetic member.

* * * * *